United States Patent
Wang et al.

(10) Patent No.: US 6,430,114 B1
(45) Date of Patent: Aug. 6, 2002

(54) SELF-LUBRICATING LAYER FOR A DATA STORAGE DISK

(75) Inventors: Po-Wen Wang, San Jose; Evan F. Cromwell, Redwood City; Olu Atanda, Campbell, all of CA (US)

(73) Assignee: Toda Citron Technologies, Inc., Milpitas, CA (US)

( * ) Notice: Subject to any disclaimer, the term of this patent is extended or adjusted under 35 U.S.C. 154(b) by 0 days.

(21) Appl. No.: 09/569,613

(22) Filed: May 12, 2000

(51) Int. Cl.[7] ............................................... G11B 11/00
(52) U.S. Cl. .................... 369/13.38; 428/64.3; 428/64.6
(58) Field of Search ........................ 369/13, 14, 275.2; 360/59, 114; 428/64.1, 64.3, 64.4, 64.6, 65.4, 65.8

(56) References Cited

U.S. PATENT DOCUMENTS

| | | | |
|---|---|---|---|
| 4,898,774 A | 2/1990 | Yamashita et al. | 428/336 |
| 4,929,500 A | 5/1990 | Yamashita et al. | 428/336 |
| 5,198,934 A | 3/1993 | Kubo et al. | 360/104 |
| 5,231,613 A | 7/1993 | Nakayama et al. | 369/13 |
| 5,447,796 A | 9/1995 | Tsukamoto et al. | 428/408 |
| 5,453,884 A | 9/1995 | Ohta et al. | 369/13 |
| 5,525,392 A | 6/1996 | Baum et al. | 428/65.5 |
| 5,568,466 A | 10/1996 | Komaki et al. | 369/275.2 |
| 5,793,553 A | 8/1998 | Smith | 360/74.1 |
| 5,870,362 A | 2/1999 | Boutaghou | 369/44.14 |
| 5,871,810 A | 2/1999 | Starcke et al. | 427/226 |
| 5,881,042 A | 3/1999 | Knight | 369/99 |
| 5,919,560 A | 7/1999 | Nishimori | 428/333 |
| 5,936,928 A | 8/1999 | Jain et al. | 369/99 |
| 5,949,612 A | 9/1999 | Gudeman et al. | 360/97.01 |
| 6,055,220 A | 4/2000 | Mamin et al. | 369/112 |
| 6,055,222 A | 4/2000 | Knight | 369/112 |
| 6,106,919 A * | 8/2000 | Lee et al. | 369/283 |
| 6,117,544 A * | 9/2000 | Hirokane et al. | 428/336 |
| 6,150,038 A * | 11/2000 | Hirokane et al. | 369/13 |

* cited by examiner

*Primary Examiner*—Tan Dinh
(74) *Attorney, Agent, or Firm*—Silicon Valley Patent Group LLP; Michael J. Halbert

(57) ABSTRACT

A silicon nitride self-lubricating layer forms the upper surface of a data storage disk. The silicon nitride self-lubricating layer can replace the carbon protective overcoat and liquid lubricant used in conventional data storage devices in which an aerodynamic slider is supported by an air bearing by providing both physical protection for the underlying recording layer and lubrication between the slider and the disk.

36 Claims, 4 Drawing Sheets

SELF-LUBRICATING LAYER FOR A DATA STORAGE DISK

BACKGROUND

1. Field of the Invention

This invention relates to the use of a self-lubricating layer for a data storage disk, and more particularly to a silicon nitride self-lubricating layer for a data storage disk.

2. Description of Related Art

Rigid disks with thin-film recording layers are a popular method for storing digital data. In a hard disk drive, a magnetic disk is installed on a spindle motor and driven to rotate. Hard disk drives utilize an actuator for positioning a read/write head over the spinning disk. The read/write head includes an electromagnetic transducer contained within an aerodynamic "slider." In conventional hard drive systems, when the disk is stationary, the slider rests on the surface of the disk. When the disk is rotated at high speeds, an air bearing is formed beneath the slider, which supports the slider slightly above the surface of the disk. The slider and disk surface are typically made extremely smooth so that the slider is capable of flying very close to the disk surface without impacting protrusions on the disk surface.

One problem encountered with air bearing-based disk storage systems occurs when the disk first begins its rotation. When the disk is stationary, the slider experiences static adhesion, or stiction, with the disk surface, particularly when both the slider and disk surfaces are very smooth. Thus, when the disk begins its rotation, the stiction between the slider and the disk can result in damage to either or both the slider and the disk. In addition, in order for the slider to fly at low heights above the disk surface, there must be good lubrication between the slider and the disk. To avoid such damage, conventional magnetic disks are provided with a diamond-like carbon (DLC) overcoat for protection and a thin layer of perfluoronated polyether (PFPE) liquid lubricant, possibly mixed with a solvent, such as PF-5060, available from the 3M Corp. of St. Paul, Minn.

The deposition of the carbon protective overcoat and the liquid lubricant requires additional processing steps, which add to the complexity of the manufacturing process. After the carbon overcoat is sputter deposited over the recording layer, the lubricant layer is applied by immersing the disk in the liquid lubricant solution. The disk is then drawn out of the lubricant to produce a uniform liquid lubricant layer over the outer surface of the disk. After lubrication, the disk is then processed through a tape burnishing step, in which a very fine abrasive tape is used to burnish both sides of the hard disk to ensure particle removal and to reduce surface asparities.

Another popular method for storing data in computer-readable form is optical recording. As used herein, the term "optical storage" refers to all computer-readable data storage systems in which data is either written or read through the use of a laser. Various kinds of optical systems are known, including but not limited to compact disk read only memories (CD-ROMs), and erasable optical data storage systems, such as phase-change and magneto-optic (MO) systems. In typical optical systems, a laser beam is focused from an optical head to record data on the recording layer of an optical disk. A small spot is generated on the recording layer modulating, for example, the phase, intensity, polarization, or reflectivity of a readout optical beam which is subsequently detected by a detector in the optical head.

MO systems typically include a data storage disk having a substrate, a magnetic recording layer, and a protective overcoat. To record data, a small portion of the recording layer is heated by a laser beam, which enables the magnetization direction of the recording layer to be switched by application of an external magnetic field. In phase-change type storage systems, information is recorded onto a disk by utilizing a recording film which is rendered in an amorphous state when heated to a given temperature (for instance, about 600° C.) higher than the melting point and then rapidly cooled and is recrystallized when heated to a temperature (for instance, about 400° C.) lower than the melting point and then slowly cooled. Recorded information is reproduced by utilizing the fact that the reflectance of light in the amorphous state is different than in the crystal state. In typical optical and MO systems, the laser can heat the desired recording portion to temperatures of 400° C. and above.

Conventional optical and MO data storage systems utilize a suspended read/write head which is mounted above the disk surface at distances of over 20 micro-inches ($\mu$"). Because of the large distance between the read/write head and the recording layer in such "far field" suspended head systems, the recording spot size is large and, accordingly, the recording density is poor. Recently, however, there has been development in the use in optical storage systems of air bearing-supported read/write heads, similar to the flying sliders in magnetic hard disk drives. The use of sliders enables the read/write head to be brought much closer to the disk surface, thereby improving the recording density. In conventional hard disk drives, the read/write head may be supported by the air bearing at a distance of approximately 20–30 nm from the disk surface.

Present data storage disk systems present numerous disadvantages. The deposition of the carbon overcoat for protection and a PFPE liquid layer for lubrication requires multiple steps and multiple layers in order for the read/write head to effectively fly close to the disk surface. The solvents used for liquid lubrication are expensive and may be environmentally hazardous. In addition, liquid lubricants are not thermally stable and can be evaporated by exposure to high heat. In optical and magneto-optical recording, in which the laser in the read/write head can create extremely high localized temperatures, depletion of the lubricant layer through evaporation can result in a significant degradation in performance.

Accordingly, there is a need for an improved system for storing data on a rotating disk which provides good, reliable lubrication and does not require additional complex processing steps.

SUMMARY

In accordance with the invention, a method of operating an electronic data storage device comprises providing a data storage disk, said disk comprising a substrate, a recording layer deposited over said substrate, and a silicon nitride self-lubricating layer deposited over said recording layer, and rotating said disk to create an air bearing to support a slider, wherein said silicon nitride self-lubricating layer provides lubrication between said disk and said slider.

In accordance with another aspect of the present invention, a disk for use with a slider that is supported by an air bearing comprises a substrate, a recording layer deposited over said substrate, and a silicon nitride self-lubricating layer deposited over said substrate and forming an upper surface of said disk, said silicon nitride self-lubricating layer providing lubrication between said slider and said disk when said slider contacts said disk.

In accordance with another aspect of the present invention, an apparatus comprises a disk comprising a substrate, a recording layer deposited over said substrate, and a silicon nitride self-lubricating layer forming an upper surface of said data storage disk, a slider supported by an air bearing created by rotation of said data storage disk, and an actuator for positioning said slider.

BRIEF DESCRIPTION OF THE DRAWINGS

For a more complete understanding of the present invention and for further features and advantages, reference is now made to the following description taking in conjunction with the accompanying drawings, in which.

DETAILED DESCRIPTION OF THE PREFERRED EMBODIMENTS

The preferred embodiments of the present invention and their advantages are best understood by referring to FIGS. 1–4 of the drawings. Like numerals are used for like and corresponding parts of the various drawings.

Figure 1:
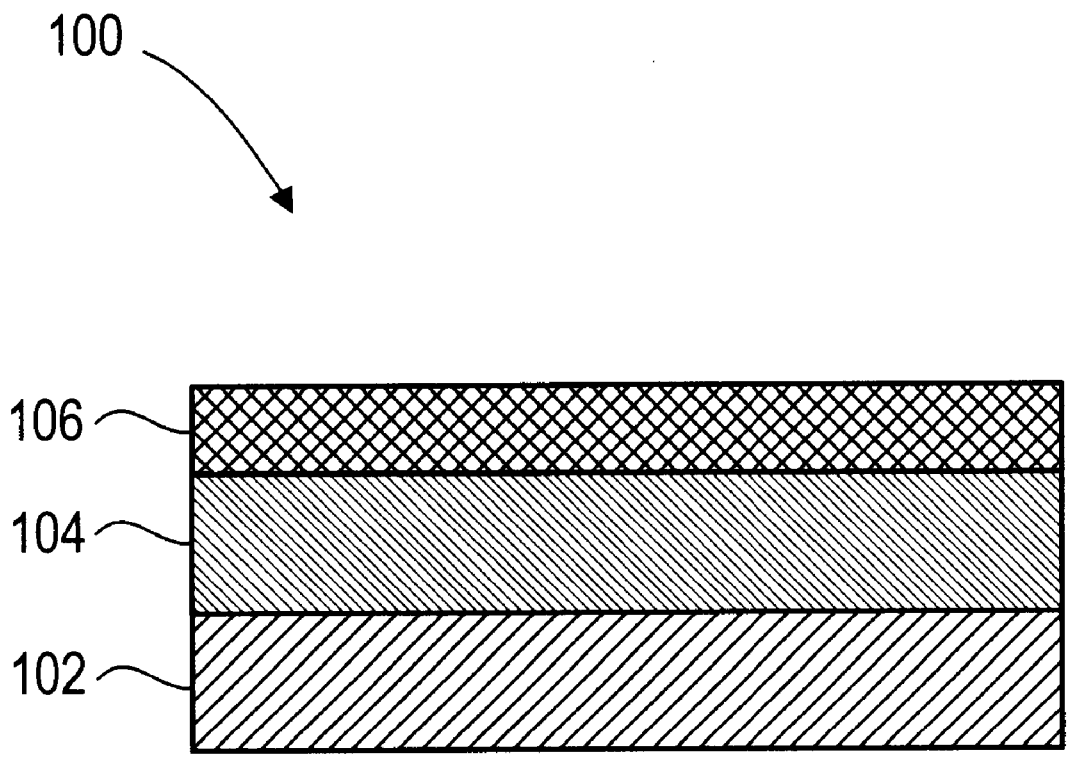
FIG. 1 shows a cross-section of a data storage disk in accordance with an embodiment of the present invention.

In accordance with a first embodiment of the present invention, a substrate 102 as shown in FIG. 1, formed of, for example, glass-ceramic or NiP-plated aluminum having a 95 mm×31.5 mil form factor, is coated with multiple layers for use in a data storage disk 100. An exemplary substrate 102 is model no. TS-10-SX-SP, available from the Ohara Corp. Substrate 102 is then washed and dried.

Next, a recording layer 104 is deposited on top of the substrate 102. As used herein, the term "outer surface" or "upper surface" is intended to refer to the outermost surface of the data storage disk. For simplicity, this discussion refers to the substrate as being the bottommost layer, and each successive layer being formed "on top of" or "over" the substrate. It is understood that these are relative terms and that identical processes can also be performed on the opposite side of the substrate to form a double-sided data storage disk.

In various embodiments, the recording layer 104 can comprise a plurality of layers deposited on top of the substrate 102. These layers may assist directly or indirectly with the recording of data onto the data storage disk 100. In one embodiment for use in a magnetic disk storage system, an adhesion/nucleation layer formed of, for example, chromium or chromium alloy is sputter deposited onto the substrate 102. Next, an active magnetic layer is sputter deposited onto the adhesion/nucleation layer.

Any of a number of known magnetic materials can be employed in the production of the active layer. Such conventional magnetic materials, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtTaB). Cobalt-base alloys having a thickness of about 100 Å to about 1000 Å have been found suitable for the active magnetic layer. The adhesion and active magnetic layers comprise recording layer 104.

In another embodiment for use in an optical disk storage system, the recording layer 104 comprises a different plurality of layers. First, a reflective adhesion layer formed of, for example, aluminum or aluminum alloy is deposited on top of the substrate 102. Next, a dielectric layer formed of, for example, silicon nitride, $SiO_2$, or $Al_2O_3$, is deposited on top of the reflective layer. Finally, an active optical layer formed of, for example, GeSbTe, CoFeTb, or CoFeGd, is deposited on top of the dielectric layer. Numerous variations of the recording layer 104 in the disk 100 are well-known to those of ordinary skill in the art.

A self-lubricating layer 106 is then deposited on top of the recording layer 104. In one embodiment, the self-lubricating layer 106 is a silicon nitride layer deposited in a direct current (DC) sputter process, as will be described in more detail below. A single self-lubricating layer 106 may advantageously serve multiple functions. First, the self-lubricating layer 106 serves as a protective layer for recording layer 104 in case of head-disk interaction or other impact on the surface of the disk 100. Next, the self-lubricating layer 106 serves as protection against corrosion. In addition, a disk 100 with a self-lubricating layer 106 can be used in an air bearing-type data storage recording system without the use of an additional fluid lubricant because the self-lubricating layer 106 provides sufficient lubrication between the read/write head of the slider and the disk 100. Furthermore, when self-lubricating layer 106 is the only layer disposed between the recording layer 104 and the read/write head, the total distance between the recording layer 104 and the read/write head can be reduced, which increases signal strength.

The use of DC sputtering to deposit the silicon nitride self-lubricating layer 106 provides numerous advantages. First, DC sputtering generally results in a higher deposition rate than RF sputtering, thereby increasing processing throughput. In addition, the DC sputter systems are generally simpler than the RF sputter systems.

In accordance with embodiments of the present invention, a silicon nitride self-lubricating layer 106 was deposited onto a recording layer 104, which was formed on a glass substrate 102. The silicon nitride self-lubricating layer 106 was deposited using a MDP-250A DC sputter system, available from Intevac, Inc., of Santa Clara, Calif. During deposition, 1.6 kW of power was applied in the sputter tool for 15 seconds. A silicon target was provided inside the sputter chamber, and argon (Ar) gas was pumped into the evacuated chamber at a constant flow rate of 6 sccm. Table I below summarizes the properties of the silicon nitride self-lubricating layer 106 deposited as a result of varying the amount of nitrogen ($N_2$) gas introduced with the Ar gas, thereby modifying the nitrogen:argon gas ratios.

TABLE I

| | Disk # | | | | |
|---|---|---|---|---|---|
| | 1 | 2 | 3 | 4 | 5 |
| $N_2$:Ar Ratio | 3.3 | 3.75 | 4.17 | 5.0 | 5.8 |
| Index of Refraction (n) | 1.83 | 1.95 | 2.15 | 2.13 | 2.1 |
| Absorption Coefficient (k) | 0.008 | <0.001 | <0.001 | <0.001 | <0.001 |
| Thickness | 307 Å | 209 Å | 98 Å | 82 Å | 71 Å |
| Reflectivity | 35% | 42% | 49% | 50% | 51% |

To deposit the silicon nitride self-lubricating layer 106 on disk 1, nitrogen gas was pumped into the sputter chamber at 20 sccm, and 1.6 kW of power was applied for 15 seconds. This formed a self-lubricating layer 106 having a thickness of 307 Å on top of the magnetic layer 104. Testing of disk 1 indicated that the index of refraction (n) of this self-lubricating layer 106 was 1.83 at a wavelength of 6500 Å, the absorption coefficient (k) was 0.008, and the reflectivity was 35%. It is generally desirable to have the absorption coefficient be close to zero, to provide substantially 100% pass through of the optical energy from the read/write head. In addition, it is also generally desirable that any layers deposited above the active optical layer have an index of refraction well matched to that of the underlying active optical layer to provide good coupling of light. The results for disks 2–5 are listed above in Table I.

Figure 2:
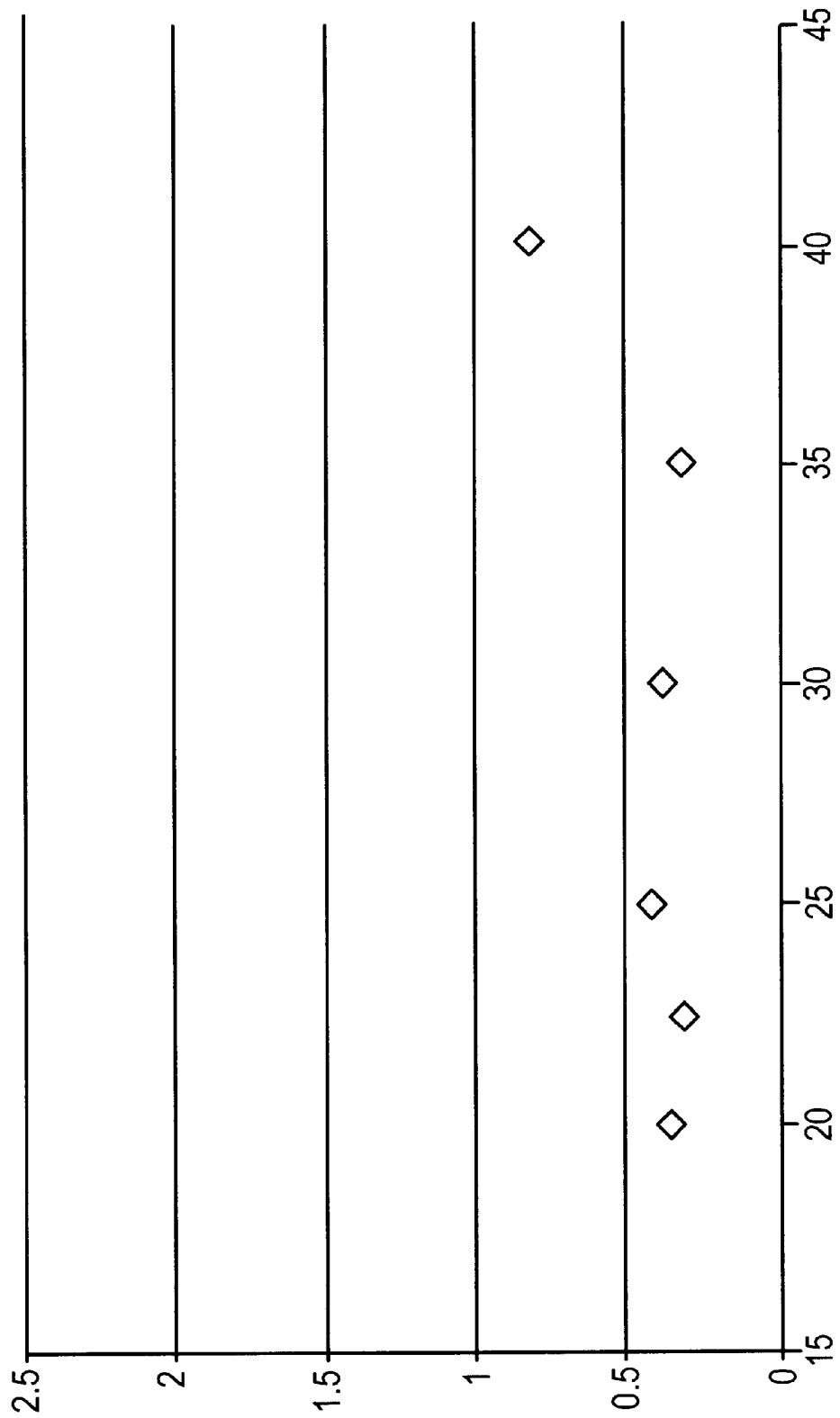
FIGS. 2–3 are charts illustrating the properties of a self-lubricating layer in accordance with embodiments of the present invention.
Figure 3:
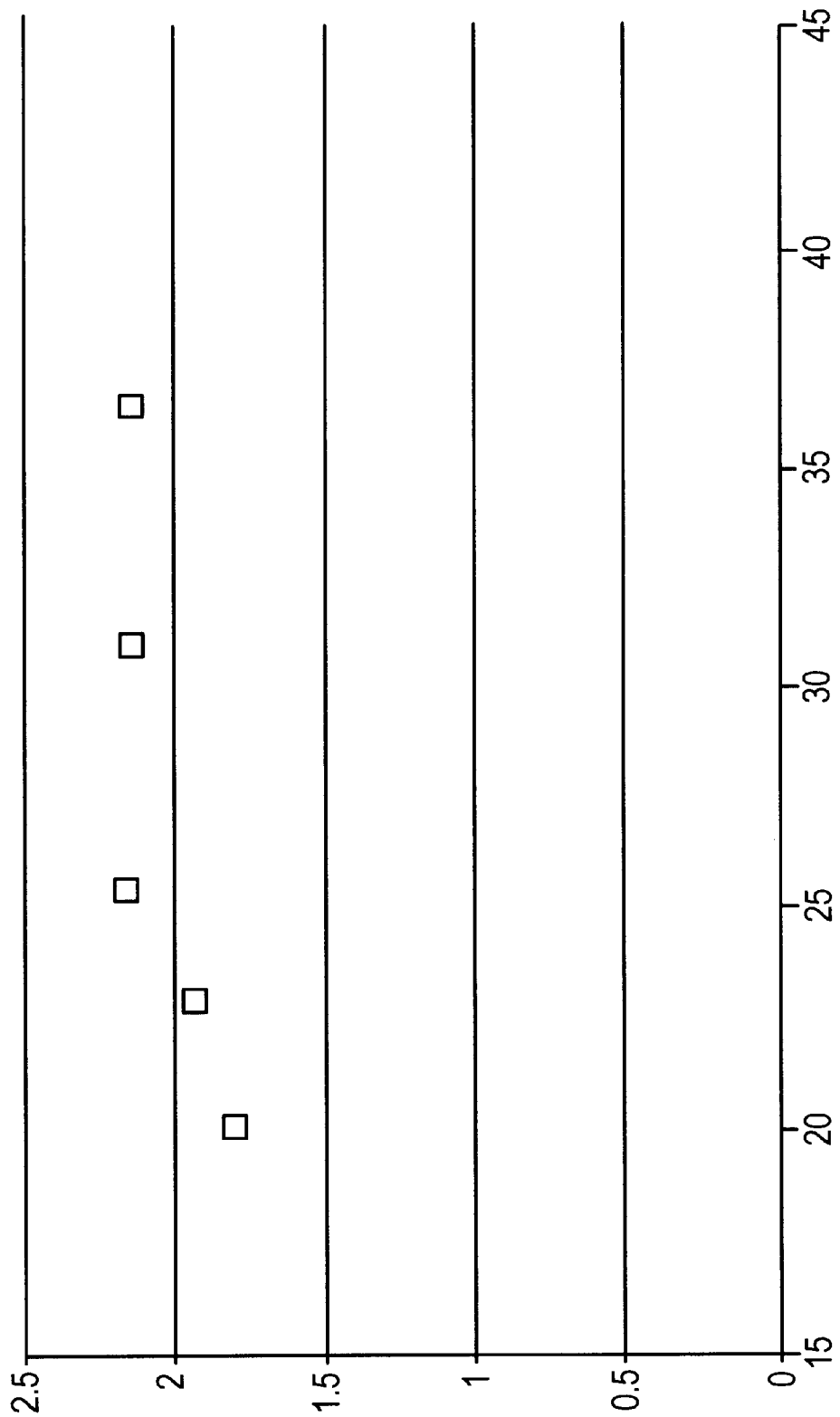

FIGS. 2–3 illustrate the performance of silicon nitride self-lubricating layers 106 applied using varying nitrogen flows, in accordance with embodiments of the present invention. Again, the self-lubricating layers 106 were applied in a DC sputter chamber containing a silicon target, using a power of 1.6 kW with an argon gas flow rate of 6 sccm. The total pressure in the chamber ranged from 6–12 mtorr. The power was applied for a period of 15 seconds, using nitrogen flow rates of 20–40 sccm, as indicated by the x-axis.

FIG. 2 shows the change in glide avalanche point in micro-inches ($\mu''$) corresponding to changes in the nitrogen flow rate. Glide tests are well-known methods for testing disk surfaces for defects and as a measure for surface lubricity. During a glide test, a glide head including a piezoelectric transducer (PZT) flies over the disk surface at a predetermined clearance from the disk surface, known as the glide height. If contact occurs between the glide head and a disk defect or asperity, the glide head vibrates and deforms, which generates a potential difference between the electrodes of the PZT. The glide avalanche point occurs when the magnitude of measured voltages exceed predetermined threshold values. The ability to fly at low heights with low glide noise indicates good lubricity of the disk surface.

As shown in FIG. 2, when the silicon nitride self-lubricating layer 106 is deposited using nitrogen flow rates of less than 40 sccm, and less than 35 sccm in particular, the glide avalanche point is observed to be less than $0.5\,\mu''$. Even at 40 sccm, the glide avalanche point remains below $1.0\,\mu''$.

FIG. 3 shows the index of refraction for the five sample disks plotted in FIG. 2. It can be seen that a nitrogen gas flow rate of 25 sccm and above produces a self-lubricating layer 106 which has an index of refraction greater than 2.0, when measured using 650 nm wavelength light. For some embodiments used with optical disk systems, it is desirable that the layers deposited over the active layer have an index of refraction greater than 2.0. Therefore, the self-lubricating layers 106 produced with nitrogen flows of over approximately 23 sccm exhibit particularly desirable optical qualities. In addition, as shown in Table I, the absorption coefficient (k) is less than 0.001 for the disks having a nitrogen:argon ratio of 3.75 and above. A low absorption coefficient is important for good optical recording.

Figure 4:
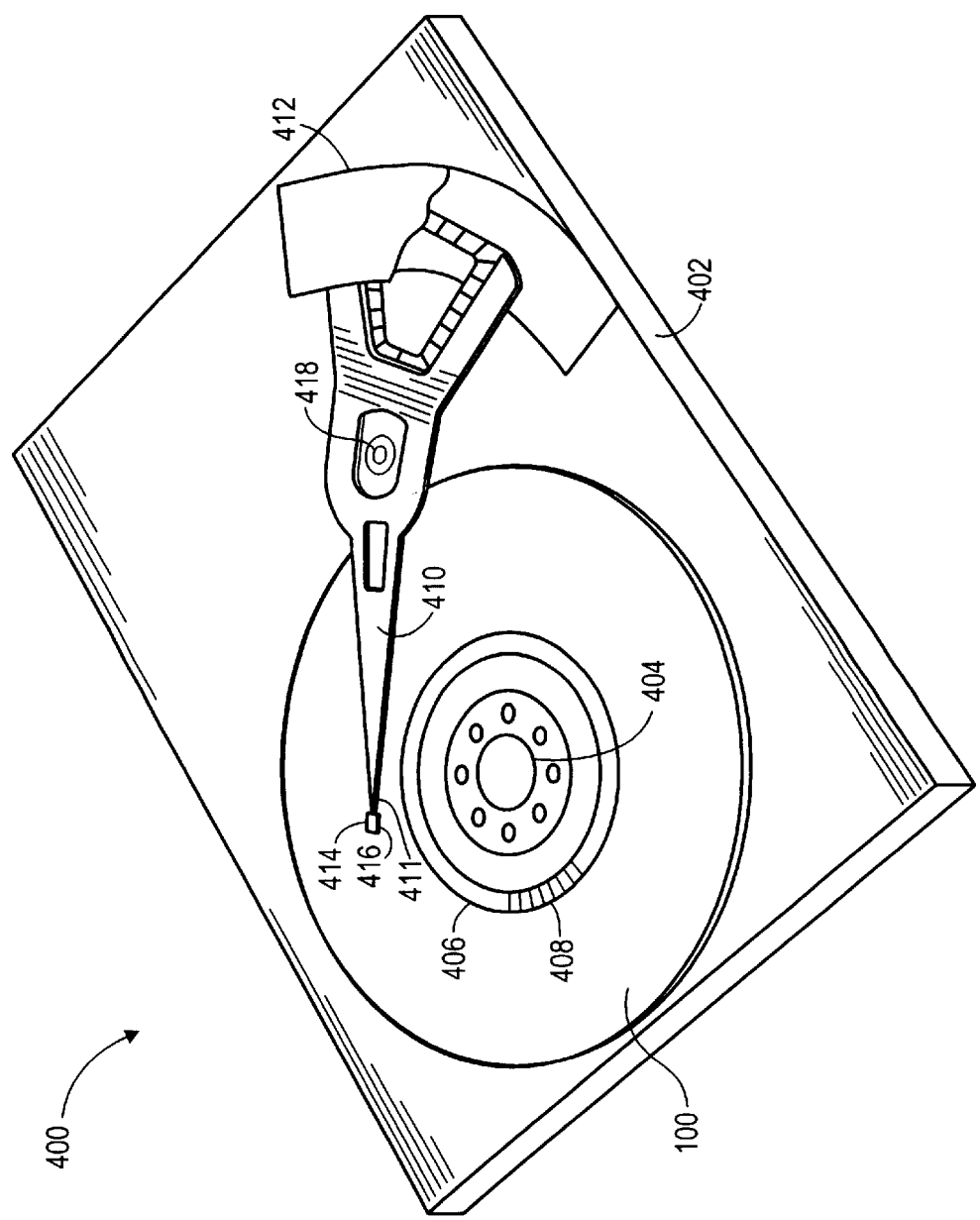
FIG. 4 shows an isometric view of a data storage system in accordance with an embodiment of the present invention.

Disks 100 prepared in accordance with embodiments of the present invention may be incorporated into a data storage system 400, as illustrated in FIG. 4. One or more disks 100 are mounted onto a base 402 through a motor-driven spindle 404. Each disk 100 is formatted to include a plurality of concentric tracks 406, each track 406 being partitioned into a plurality of sectors 408. The data being stored on disk 100 is stored in individual bit fields within each sector 408.

An actuator 410 having a distal end 411 is selectively radially positionable adjacent the disk surface. A read/write head 416 is carried on a slider 414 which is coupled to the distal end 411 of the actuator 410. The actuator 410 is pivotable about an axis 418, and voice coil motor 412 rotates the actuator 410 about the axis 416 to position the read/write head 416 over a desired track 406 on disk 100. As used herein, the term "read/write head" is intended to refer to a class of mechanisms which are used to read and/or write data on a thin-film recordable storage medium. In inductive magnetic recording, a single electromagnet can be used to both read and write data. It is understood that in some storage systems, such as in conventional CD-ROM players, the read/write head is capable of only reading data from the disk. In other systems, the read/write head includes separate components for reading and writing data, as is the case for conventional magneto-optical systems and magnetoresistive (MR) media. When writing data in a magneto-optical system, a laser is used in conjunction with an electromagnetic writing component to orient the crystals in the recording medium. When reading the data, a laser and sensor are used to determine the orientation of the recorded crystals. It is intended that "read/write head" include all mechanisms which are used for either reading or writing on a data storage disk.

In data storage systems 400 utilizing the contact start stop (CSS) method, when the spindle 404 is not rotating disk 100, the slider 414 rests on the surface of the disk 100. When the spindle 404 rotates the disk 100, an air bearing is formed between the slider 414 and the disk 100, thereby supporting the slider 414 and allowing the slider 414 to fly over the disk surface. By flying over the surface of the medium, the slider 414 avoids irregularities in the disk's surface that would otherwise cause rapid wear and ultimately compromise data.

In an alternative embodiment, a data storage system 400 can utilize well-known load/unload techniques. As in CSS systems, when the spindle 404 is rotating the disk 100 at sufficiently high speeds, an air bearing supports the slider 414 over the disk surface. In load/unload systems, unlike CSS systems, a ramp is used to lift the slider 414 before the disk 100 stops rotating, thereby preventing the slider 414 from coming to a rest on top of a stationary disk 100.

While it is known to use silicon nitride as a protective layer in some magneto-optical disks, such systems utilize suspended read/write heads instead of air bearings. As a result, the distance between the read/write head is significantly greater than in systems utilizing air bearings and a flying slider, and the need for lubrication is eliminated.

In conventional systems in which an air bearing and slider is used, a liquid lubricant, such as PFPE, must be applied to the surface of the disk in order to prevent damage to the disk. In accordance with embodiments of the present invention, however, the silicon nitride self-lubricating layer 106 provides sufficient lubrication between the slider 414 and the disk 100 such that no additional lubrication is needed. The silicon nitride self-lubricating layer 106 additionally provides sufficient mechanical protection for the recording layer 104 so that a separate protection layer may not be needed. The above-described embodiments also eliminate the prior need for additional lube and tape burnishing steps, because the single self-lubricating layer 106 provides both protection and lubrication. In addition, the solid silicon nitride self-lubricating layer 106 will not evaporate under high operating temperatures, which eliminates the problems caused by the depletion of conventional fluid lubricants. This is particularly advantageous when used in optical data storage systems, in which a laser from the read/write head 416 may heat the disk 100 to extremely high temperatures.

It will be understood that various embodiments of the present invention may utilize different compositions of silicon nitride, $Si_xN_y$, wherein x and y are variable, depending on the embodiment.

Although the invention has been described with reference to particular embodiments, the description is only an example of the invention's application and should not be taken as a limitation. In particular, even though much of the preceding discussion was directed to particular types of computer-readable storage media, alternative embodiments of this invention may be used in any type of rotating data storage disk which utilizes a flying slider. Various other adaptations and combinations of features of the embodiments disclosed are within the scope of the invention as defined by the following claims.

We claim:

1. A method of operating an electronic data storage device, comprising:
   providing a data storage disk, said disk comprising a substrate, a recording layer deposited over said substrate, and a silicon nitride self-lubricating layer sputter deposited in the presence of argon and nitrogen introduced at a nitrogen:argon ratio of at least about 3.3 over said recording layer;
   rotating said disk to create an air bearing to support a slider;
   wherein said silicon nitride self-lubricating layer provides lubrication between said disk and said slider.

2. The method of claim 1, further comprising loading said slider onto a load ramp adjacent said disk.

3. The method of claim 1, further comprising contacting said slider with said silicon nitride self-lubricating layer by ceasing said rotation of said disk.

4. The method of claim 3, further comprising resuming rotation of said disk to again create said air bearing to support said slider.

5. The method of claim 1, further comprising directing a laser from a read/write head provided in said slider to said recording layer.

6. The method of claim 1, wherein said silicon nitride self-lubricating layer comprises a direct-current sputter-deposited silicon nitride layer.

7. The method of claim 1, wherein said nitrogen:argon ratio is between approximately 3.3 and 6.7.

8. The method of claim 1, wherein said nitrogen:argon ratio is at least about 4.0.

9. The method of claim 1, wherein said substrate comprises one of the group consisting of glass, polycarbonate, and aluminum.

10. The method of claim 1, wherein said recording layer comprises an active optical layer.

11. The method of claim 1, wherein said active optical layer comprises a magneto-optical material or a phase-change type material.

12. A disk for use with a slider that is supported by an air bearing, comprising:
    a substrate;
    a recording layer deposited over said substrate; and
    a silicon nitride self-lubricating layer sputter deposited over said substrate in the presence of argon and nitrogen gas introduced at a nitrogen:argon ratio of at least about 3.3 and forming an upper surface of said disk, said silicon nitride self-lubricating layer providing lubrication between said slider and said disk when said slider contacts said disk.

13. The disk of claim 12, wherein said silicon nitride self-lubricating layer comprises a direct-current sputter-deposited silicon nitride layer.

14. The disk of claim 12, wherein said nitrogen:argon ratio is between approximately 3.3 and 6.7.

15. The disk of claim 12, wherein said nitrogen:argon ratio is at least about 4.0.

16. The disk of claim 12, wherein said substrate comprises one of the group consisting of glass, polycarbonate, and aluminum.

17. The disk of claim 12, wherein said recording layer comprises an active optical layer.

18. The disk of claim 17, wherein data is stored in said recording layer by directing a laser at said recording layer.

19. An apparatus, comprising:
    a data storage disk comprising a substrate, a recording layer deposited over said substrate, and a silicon nitride self-lubricating layer forming an upper surface of said data storage disk, wherein said silicon nitride self-lubricating layer comprises a sputter-deposited silicon nitride layer that was sputter deposited in the presence of nitrogen and argon gas introduced at a nitrogen:argon ratio of at least about 3.3;
    a slider supported by an air bearing created by rotation of said data storage disk; and
    an actuator for positioning said slider.

20. The apparatus of claim 19, wherein said slider includes a read/write head comprising a laser.

21. The apparatus of claim 19, wherein said silicon nitride self-lubricating layer comprises a direct-current sputter-deposited silicon nitride layer.

22. The apparatus of claim 19, wherein said nitrogen:argon ratio is between approximately 3.3 and 6.7.

23. The apparatus of claim 19, wherein said nitrogen:argon ratio is at least about 4.0.

24. The apparatus of claim 19, wherein said substrate comprises one of the group consisting of glass, polycarbonate, and aluminum.

25. The apparatus of claim 19, wherein said recording layer comprises an active optical layer.

26. The apparatus of claim 25, wherein said active optical layer comprises a magneto-optical material or a phase-change type material.

27. A method of manufacturing a data storage device to be used with a slider, said method comprising:
    providing a substrate;
    depositing a recording layer over said substrate; and
    depositing a lubrication layer directly on said recording layer by sputtering silicon nitride on said recording layer;
    wherein nitrogen and argon gas is introduced during sputtering said silicon nitride, with a nitrogen:argon ratio of at least about 3.3.

28. The method of claim 27, wherein a nitrogen:argon ratio is from approximately 3.3 to approximately 6.7.

29. The method of claim 27, wherein said nitrogen:argon ratio is at most about 4.0.

30. The method of claim 27, wherein said recording layer comprises an optical layer.

31. The method of claim 29, wherein said optical layer comprises at least one of a magneto-optical material and a phase-change type material.

32. The method of claim 29, said method further comprising:
    depositing a reflective layer over said substrate prior to depositing said optical layer; and
    depositing a dielectric layer over said reflective layer prior to depositing said optical layer.

33. The method of claim 27, wherein said recording layer comprises a magentic layer.

34. A disk for use with a slider that is supported by an air bearing, comprising:
  a substrate;
  a recording layer deposited over said substrate; and
  a silicon nitride lubrication layer deposited directly on said recording layer;
  wherein said silicon nitride lubrication layer comprises a direct-current sputter-deposited silicon nitride layer deposited in the presence of nitrogen and argon gas introduced at a nitrogen:argon ratio of at least about 3.3.

35. The disk of claim 34, wherein said recording layer comprises an active optical layer.

36. The disk of claim 34, wherein said recording layer comprises a magentic layer.

* * * * *